(12) United States Patent
Saito et al.

(10) Patent No.: US 6,188,514 B1
(45) Date of Patent: *Feb. 13, 2001

(54) CONFOCAL MICROSCOPE

(75) Inventors: Yoshiharu Saito; Hiroyuki Nishida, both of Hachioji (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/018,478

(22) Filed: Feb. 4, 1998

(30) Foreign Application Priority Data

Feb. 4, 1997 (JP) .................................... 9-021429

(51) Int. Cl.[7] .................................... G02B 21/00
(52) U.S. Cl. ..................... 359/381; 359/389; 359/234
(58) Field of Search ..................... 359/368, 363, 359/381, 389, 234, 235; 348/253, 263, 582, 337

(56) References Cited

U.S. PATENT DOCUMENTS

| 3,926,500 | 12/1975 | Frosch et al. |
|---|---|---|
| 4,927,254 | 5/1990 | Kino et al. |
| 5,113,247 | * 5/1992 | Akiyama et al. ............ 358/51 |
| 5,134,468 | * 7/1992 | Ohmuro .................... 358/50 |
| 5,161,052 | * 11/1992 | Hill ....................... 359/377 |
| 5,296,700 | * 3/1994 | Kumagai ................... 250/216 |

FOREIGN PATENT DOCUMENTS

| 55-140805 | 11/1980 | (JP) . |
|---|---|---|
| 2-53016 | 2/1990 | (JP) . |
| 5-26635 | 2/1993 | (JP) . |
| 7-63995 | 3/1995 | (JP) . |
| 8-211296 | 8/1996 | (JP) . |

OTHER PUBLICATIONS

Tsujiuchi., "Correction of Optical Images by Compensation of Aberrations and by Spatial Frequency Filtering", Progress in Optics, vol. II, 1963.

* cited by examiner

*Primary Examiner*—Cassandra Spyrou
*Assistant Examiner*—Mark A. Robinson
(74) *Attorney, Agent, or Firm*—Pillsbury Madison & Sutro LLP

(57) ABSTRACT

The invention relates to a confocal microscope which has high resolving power and a great focal depth and is capable of observing a sample in real time, so that a fine stereoscopic structure of a highly integrated IC or the like can be inspected, and provides a confocal microscope in which a pinhole substrate 2 having a plurality of pinholes, located at a position of an image formed by an objective 4, is illuminated by light coming from a light source 1 to focus light passing through pinhole substrate 2 onto a sample 6 by objective 4 so that an image is formed thereon, light reflected at sample 6 is again focused onto pinhole substrate 2 through objective 4 to form an image thereon, light passing through pinhole substrate 2 is focused by a relay lens 7 or the like to re-form an image in the form of a sample image, and sample 6 is scanned with light by high-speed rotation of pinhole substrate 2 to obtain a reconstructed image of sample 6, wherein a longitudinal chromatic aberration-producing optical element 5 is located between pinhole substrate 2 and sample 6.

12 Claims, 8 Drawing Sheets

CONFOCAL MICROSCOPE

BACKGROUND OF THE INVENTION

1. Field of the Invention

The present invention relates generally to a confocal microscope, and more particularly to an optical microscope that has high resolving power and a great focal depth and is capable of providing real time observation of images.

2. Discussion of Related Art

A confocal microscope comprising a confocal scanner designed to scan a sample through an objective using illumination light passing through a pinhole substrate having a plurality of pinholes while the pinhole substrate is rotated has so far been known in the art. For instance, a typical confocal microscope is disclosed at great length in U.S. Pat. Nos. 3,926,500 and 4,927,254.

An increase in the degree of integration of ICs recently developed in the semiconductor field now leads to IC samples and mask samples that cannot be identified with the resolving power of a conventional optical microscope. An inspection of such samples may be made using electron microscopes, interatomic force microscopes, etc. However, such microscopes are not suitable for total inspection machines on mass-production lines because much time is taken for inspection, samples break down, etc. A confocal type laser scanning microscope having a higher resolving power than does a conventional microscope, on the other hand, is not perfect for use on mass-production lines in view of inspection time, etc.

A confocal microscope comprising a pinhole substrate, to which the present invention is applied, now attracts attention in the semiconductor field because it has characteristic features that the aforesaid microscopes do not have. That is, the confocal microscope has a confocal effect resulting from a specific arrangement where an array of pinholes are located at a position conjugate with a sample surface, and so it is possible to achieve resolving power and contrast higher than would be possible with a conventional optical microscope. In particular, the resolving power in the optical axis (Z) direction is so high that sample information in the height direction can be obtained with high precision. Also, the confocal microscope enables a sample to be observed in real time or at a speed higher than video rates with human eyes or on an image pickup device as in the case of an optical microscope, because a scan of the sample by pinholes takes place by the high-speed rotation of the pinholes lying within a microscope field. In addition, the confocal microscope can be manipulated using a high-intensity white light source with no need of using a laser, etc., so that chromatic information, too, can be observed with ease. By reason of such characteristic features that are different from those of a laser scanning type confocal microscope, much attention is paid to the confocal microscope.

A specific requirement for an IC sample is, on the other hand, that sample information in a step be concurrently observed at a great focal depth because the IC sample has a stereoscopic structure. With the confocal microscope, however, it is impossible to meet the aforesaid requirement because its depthwise resolving power is high whereas its focal depth is short.

The simplest and most ordinary method of achieving a focal depth increase is to restrict the NA (numerical aperture) of illumination light using an aperture stop. With this method, however, there is a lowering of the resolving power in a lateral direction perpendicular to the optical axis.

Some proposals have now been put forward to achieve a focal depth increase without causing any lowering of the lateral resolving power. For instance, "Progress in Optics", II, p. 131, North-Holland Pub. Co. (1963) introduces a technique for achieving a multifocal lens by disposing a zonal form of phase film having a phase shift X at a pupil position of a phototaking lens. JP-A 7-63995 proposes to achieve a focal depth increase without any lowering of resolving power by means of a filter through which a substantial portion of NA passes slightly, i.e., without recourse to the simple restriction of the NA of illumination light. A method using image processing, too, is proposed in the art. For instance, JP-A 55-140805 puts forward a method for removing the blurring of an image by image processing while a relative distance between an objective and an optical axis of a sample is varied, thereby achieving a focal depth increase without any lowering of resolving power.

Methods of observing a sample having a stereoscopic structure by making use of chromatic aberrations produced at a lens, too, have been put foward in the art. For example, JP-A 2-53016 proposes an objective system designed to obtain a multifocal image by the insertion of a chromatic aberration-producing lens system therein, so that a focal position can be varied per varying wavelength. JP-A 5-26635 proposes a confocal laser scanning type microscope wherein an optical system having chromatic aberrations and a semiconductor laser with a wavelength varying dependently on temperature changes are used to perform scanning in an optical axis direction in place of conventional mechanical scanning. JP-A 8-211296 proposes a confocal microscope system with a detector located at a position conjugate with a light source, wherein the overall system is so allowed to have chromatic aberrations that a focal position can be varied per varying wavelength to obtain a multifocal image thereby achieving a focal depth increase.

Conventional confocal microscopes are more improved in terms of resolving power than general optical microscopes inclusive of a confocal microscope comprising a pinhole substrate, to which the present invention is applied. To observe the shape of a sample in an optical axis direction, however, it is required to vary a relative distance between an objective and the sample. In other words, it is difficult to observe the stereoscopic structure of the sample in real time. The confocal laser scanning type microscope of JP-A 5-26635, too, has the same problem as the aforesaid confocal microscopes because scanning is performed in the optical axis direction by making use of chromatic aberrations.

Even with the system of JP-A 55-140805, it is again difficult to make a real time observation of a sample because the scanning in the optical axis direction is required although the system is not a confocal system. In addition, this system is inferior to a confocal system in terms of resolving power.

The systems described in "Progress in Optics", II, p. 131, North-Holland Pub. Co. (1963) and JP-A 7-63995 achieve high resolving powers and great focal depths by the modulation of illumination light or a pupil. Strictly speaking, however, it is impossible to achieve high resolving power although some considerable focal depth may be achieved.

JP-A 2-53016 is directed to an invention for the achievement of a multiple focus by making use of chromatic aberrations. When it is intended to increase the focal depth by simple use of this, however, blurred images of different colors are superposed one upon another, resulting in resolving power and contrast decreases. Even according to the teachings given in JP-A 2-53016, it is thus impossible to increase the resolving power and focal depth.

The confocal microscope of JP-A 8-211296 achieves high resolving power and a great focal depth because of making use of chromatic aberrations and a confocal optical system. A problem with this is, however, that the arrangement becomes complicated because of using a plurality of light sources. Also, since the confocal optical system (e.g., the objective) produces chromatic aberrations, some limitation is placed on using the confocal microscope as a microscope capable of ordinary observations. In addition, it is impossible to provide a confocal observation of a sample, so rendering it difficult to obtain chromatic information from the sample.

As mentioned above, with microscopes proposed so far in the art it is not possible to achieve resolving power and focal depth comparable to those of a confocal microscope. Even if this is possible, some problems would arise such as a complicated microscope structure, incapability of ordinary observations, and a failure in obtaining chromatic information from a sample.

SUMMARY OF THE INVENTION

In view of such problems in association with the prior art, it is an object of the present invention to provide a confocal microscope having high resolving power and a great focal depth and capable of real time observations, so making it possible to provide an inspection of a fine stereoscopic structure of a highly integrated IC, etc., which could not be made in the prior art.

According to the present invention, the aforesaid object is accomplished by the provision of a confocal microscope wherein a pinhole substrate having a plurality of pinholes, located at a position of an image formed by an objective, or at a position conjugate with or in the vicinity of the position of the image, is illuminated by light coming from a light source to focus light passing through said pinhole substrate onto a sample by said objective so that an image is formed thereon, light reflected at said sample is again focused onto said pinhole substrate or a position in the vicinity thereof through said objective to form an image thereon, light passing through said pinhole substrate is focused by a relay lens or the like to re-form an image in the form of a sample image, and said sample is scanned with light by high-speed rotation of said pinhole substrate to obtain a reconstructed image of said sample, said confocal microscope being characterized in that a longitudinal chromatic aberration-producing optical element is located between said pinhole substrate and said sample.

In what follows, an account will be given of why the aforesaid arrangement is used in the invention, how it works, and some modifications of the arrangement.

In the confocal microscope of the invention, light emitted from a white light source or the like passes through an array of pinholes at a position conjugate with the image formed by the objective, and is focused onto a sample through the longitudinal chromatic aberration-producing optical element and objective to form an image thereon. The position of the image formed on the sample is shifted in the optical axis direction depending on wavelength. Light reflected from a sample position varying per wavelength is focused onto an array of pinholes through the longitudinal chromatic aberration-producing optical element and objective to form an image thereon. The light is reciprocally propagated from the pinholes to the sample, and from the sample to the pinholes, and so the position of the image formed on the pinholes is invariable irrespective of wavelength. The light passing through the pinholes are guided to an observation side, so that images on the sample position varying in the optical axis direction can simultaneously be observed in separate colors. Since the system is a confocal optical system, a blurred image at each wavelength is cut off by the pinholes so that the sample can be observed with high resolving power and high contrast and at a great focal depth. In addition, sample information in the optical axis direction can be learned per image color. Since the sample is scanned by the rotation of the pinhole substrate, the aforesaid observation can be made in real time or at a speed higher than video rates. It is here to be noted that a disk with a number of pinholes formed therein, like NIPKOW DISK, may be used for the pinhole substrate.

Furthermore in the invention, the aforesaid longitudinal chromatic aberration-producing optical element can be detachably inserted in an optical path. When this longitudinal chromatic aberration-producing optical element is inserted in the optical path, the optical axis direction of the sample can be observed at a great focal length in separate colors. When the optical element is withdrawn from the optical path, a section of the sample can be brightly and clearly observed.

In the invention, it is desired that the refracting power of the aforesaid longitudinal chromatic aberration-producing optical element with respect to a center wavelength in the wavelength region used be substantially zero, because this allows the optical element to produce chromatic aberration without changing the image position, magnification, etc.

When, in the invention, the aforesaid longitudinal chromatic aberration-producing optical element is withdrawn from the optical path, it is desired that the quantity of longitudinal chromatic aberration produced at a portion of the optical system between the pinhole substrate and the sample be smaller than the focal depth of the objective. For the inspection of a highly integrated IC or the like, darkfield microscopy is used to detect an edge shape of an IC pattern, a minute flaw therein, etc. When darkfield microscopy is carried out with the present confocal microscope comprising a pinhole substrate, the pinholes are ordinarily withdrawn from the optical path; otherwise, the arrangement becomes complicated, an image under observation becomes dark, etc. However, since this microscopy is equivalent to that using an general optical microscope, it is difficult to inspect a sample when the optical system has much chromatic aberrations, because the blurring of colors becomes remarkable upon darkfield microscopy. When the chromatic aberration-producing optical element is withdrawn from the optical path, it is thus desired that the quantity of longitudinal chromatic aberration produced at the above portion of the optical system be smaller than the focal depth of the objective. Although the focal depth may be increased by the chromatic aberration-producing optical element according to the invention, it is to be understood that the spectral characteristics, thickness, etc. of the sample cannot be measured and inspected using chromatic information because the section of the sample is separated for each color. When the aforesaid chromatic aberration-producing optical element is withdrawn from the optical path, it is thus preferable to make the quantity of chromatic aberrations produced at the above portion of the optical system smaller than the focal depth of the objective, so that the measurement and inspection making use of chromatic information can be performed in confocal real time.

In the invention, it is also desired that the aforesaid optical element be located between the pinhole substrate and the objective and at a back focal position of the objective or in the vicinity thereof, or at a position conjugate with the back focal position of the objective or in the vicinity thereof, because this simple arrangement enables longitudinal chromatic aberration to be produced with no generation of chromatic aberration of magnification.

Furthermore in the invention, it is desired that the aforesaid optical element comprise at least one convex lens and at least one concave lens and satisfy the following condition (1):

$$|v_P - v_N| \cdot (NA)^2 \cdot f_{OB}/f > 0.01 \qquad (1)$$

where $v_P$ is an Abbe's number of the convex lens at a center wavelength $\lambda$, $v_N$ is an Abbe's number of the concave lens at the center wavelength $\lambda$, $f_{OB}$ is a focal length of the objective used at the center wavelength $\lambda$, NA is a numerical aperture of the objective used, and f is a focal length of the convex lens at the center wavelength $\lambda$.

The quantity of chromatic aberration produced by the aforesaid chromatic aberration-producing optical element is determined by an Abbe's number difference between the convex and concave lenses, and the refracting power (focal length) of the convex lens. The larger the Abbe's number difference or the stronger the refracting power of the convex lens, the more the quantity of chromatic aberrations produced is. It is also required to alter the quantity of chromatic aberrations produced depending on the focal depth of the objective on a sample side. The quantity of chromatic aberrations produced at a sample surface must be increased with an increase in the focal depth. The focal depth is proportional to the square of NA. Condition (1) is provided while taking into account the aforesaid considerations and the multiplication of the focal length of the objective used—which is required for the standardization of refracting power.

When the lower limit of 0.01 in condition (1) is not reached, the separation of chromatic aberrations in the optical axis direction diminishes, and so the focal depth cannot be increased.

The aforesaid optical element can be very simplified in construction by composing it of one convex lens and one concave lens while condition (1) is satisfied.

The construction of this optical element can be much more simplified if it is composed of a doublet consisting of a plano-convex lens and a plano-concave lens with a cemented surface thereof having a certain curvature.

The present invention also provides a confocal microscope wherein a pinhole substrate having a plurality of pinholes, located at a position of an image formed by an objective, or at a position conjugate with or in the vicinity of the position of the image, is illuminated by light coming from a light source to focus light passing through said pinhole substrate onto a sample by said objective so that an image is formed thereon, light reflected at said sample is again focused onto said pinhole substrate or a position in the vicinity thereof through said objective to form an image thereon, light passing through said pinhole substrate is focused by a relay lens or the like to re-form an image in the form of a sample image, and said sample is scanned with light by high-speed rotation of said pinhole substrate to obtain a reconstructed image of said sample, said confocal microscope being characterized in that a longitudinal chromatic aberration-producing element is located between the pinhole substrate and the objective. This embodiment of the invention is preferable because between the pinholes and the objective there is a space that is large enough to receive this optical element. No particular limitation is imposed on the size of the optical element, etc.

In the invention, it is desired that the aforesaid optical element comprise two lens groups G1 and G2, each comprising at least one convex lens and at least one concave lens, and satisfy the following condition (2):

$$|v_{P1} - v_{N1}| \cdot (NA)^2 \cdot f_{OB}/f_1 > 0.1 \qquad (2)$$

where $v_{P1}$ is an Abbe's number of the convex lens in the lens group G1 at a center wavelength $\lambda$, $v_{N1}$ is an Abbe's number of the concave lens in the lens group G1 at the center wavelength $\lambda$, $f_{OB}$ is a focal length of the objective used at the center wavelength $\lambda$, NA is a numerical aperture of the objective used, and $f_1$ is a focal length of the convex lens in the lens group G1 at the center wavelength $\lambda$.

If the aforesaid optical element is composed of one lens group, it is often impossible to make correction for chromatic aberration of magnification. However, if, as in the invention, the optical element is composed of two lens groups G1 and G2, it is then possible to produce longitudinal chromatic aberration while chromatic aberration of magnification is reduced. The concept of condition (2) is exactly the same as that of condition (1). Again, when the lower limit of 0.01 in condition (2) is not reached, the separation of chromatic aberrations in the optical axis direction diminishes, and so it is impossible to increase the focal depth.

In this case, it is desired that one lens group G1 be located nearer a back focal length position of the objective or a position conjugate therewith than another lens group G2, and the two lens groups G1 and G2 satisfy the following condition (3):

$$|v_{P1} - v_{N1}|/f_1 > |v_{P2} - v_{N2}|/f_2 \qquad (3)$$

where $v_{P2}$ is an Abbe's number of the convex lens in the lens group G2 at a center wavelength $\lambda$, $v_{N2}$ is an Abbe's number of the concave lens in the lens group G2 at the center wavelength $\lambda$, and $f_2$ is a focal length of the convex lens in the lens group G2 at the center wavelength $\lambda$.

In general, the back focal position of an objective is located within the objective and an off-axis chief ray exits the optical axis at the back focus position. So the height of an off-axis chief ray passing through the lens group G2 farther off the objective as compared with the lens group G1 is higher than the height of an off-axis chief ray passing through the lens group G1. For this reason, the lens group G2 is more likely to produce chromatic aberration of magnification than the lens group G1. On the other hand, the height of an axially focused light ray is substantially the same upon passing through the lens groups G1 and G2. The quantity of longitudinal chromatic aberration produced at the lens groups G1 and G2 is determined by the Abbe's number, focal length, etc. of the lenses forming each group. In the invention, it is desired that condition (3) be satisfied so as to produce longitudinal chromatic aberration with no introduction of chromatic aberration of magnification. As already noted, the lens group G2 is more likely to produce chromatic aberration of magnification than the lens group G1. It is thus required to offset the chromatic aberration of magnification produced at the lens group G1 against that produced at the lens group G2 by making the Abbe's number difference between the convex and concave lenses constituting the lens group G2 smaller than that in the lens group G1 or increasing the focal length of the aforesaid convex lens, so that the quantity of chromatic aberration of magnification produced at the lens group G1 can be equal to that at the lens group G2, thereby opposing the signs of the Abbe's numbers of the convex and concave lenses constituting each lens group to each other. The lens group G1 is larger in terms of the ratio of focal length to Abbe's number than the lens group G2, and so longitudinal chromatic aberration is produced much more at the lens group G1 than at the lens group G2. Consequently, uniform chromatic aberrations are produced axially as well as longitudinally, so that the profile of the sample in the optical axis direction can be observed in separate colors. Unless condition (3) is satisfied, the chromatic aberration of magnification increases with a decrease in the longitudinal chromatic aberration. This, in turn, leads to color shades throughout the field of view, so making the color separation of the sample in the optical axis direction difficult.

Also, the aforesaid optical element may comprise two lens groups G1 and G2, each consisting of one convex lens and one concave lens, and satisfy condition (2). This makes it possible to provide a simple and inexpensive optical element. By conforming to condition (2), the profile of the sample in the optical axis direction can be observed in separate colors.

It is desired that the lens group G1 be nearer the back focal position of the objective or a position conjugate therewith when compared with the lens group G2, and both of the lens groups satisfy condition (3). It is to be noted that the reason the lens group G1 is located at the back focal position of the objective or a position conjugate therewith is the same as already mentioned.

In the confocal microscope of the invention, at least two optical elements producing different longitudinal chromatic aberrations may be located between the pinhole substrate and the sample, and such two or more optical elements may be mutually replaced or detachably located. It is to be noted that the replacement or detachable location of these optical elements is carried out by a moving mechanism not shown.

In this case, the color separation quantity of the sample in the optical axis direction is determinable by the quantity of longitudinal chromatic aberration produced by the optical element to be inserted in the optical path. So the focal depth or the color separation quantity of the sample in the optical axis direction can be altered by use of at least two optical elements that produce different longitudinal chromatic aberrations.

It is desired that at least one of such two or more optical elements satisfy such requirements for arrangement, condition, etc. as mentioned above. It is thus possible to make the optimum observation of the sample in the optical axis direction.

Furthermore in the confocal microscope of the invention, one of the aforesaid at least two optical elements may be changed over to another in association with alteration of the type of objective. The focal depth of the objective varies depending on the NA, and other factors of the objective. The color separation quantity of the sample in the optical axis direction by the longitudinal chromatic aberration-producing optical element remains invariable on a lens image plane if the optical element is constant. Upon variation of NA, however, this quantity varies in inverse proportion to the square of NA on the sample side. Consequently, when the type of the objective is altered, it is desired to alter the longitudinal chromatic aberration-producing optical element so as to optimize the color separation quantity of the sample in the optical axis direction.

In a preferable embodiment, the confocal microscope of the invention is designed such that an image formed by the confocal microscope is phototaken to obtain data about the image, and image processing is then carried out on the basis of this image data and chromatic aberration data known about the aforesaid optical element to construct an image of the sample in the optical axis direction.

One major feature of the confocal microscope of the invention is that the focal plane is variable for each color and a blurred image of each color is cut off by an array of confocal pinholes, so that the focal depth can be increased without any lowering of resolving power. It is also possible to make the focal depth larger than the thickness of the sample by increasing the quantity of chromatic aberrations produced by the chromatic aberration-producing optical element and, hence, obtain information on the sample in the optical axis direction at once without focusing. At this time, data obtained by an image pickup device are data where the optical axis direction of the sample is chromatically separated. The quantity of chromatic aberrations is previously calculated or determined, and data on how color separation takes place depending on the height of the sample is stored. Then, the obtained sample data are converted to data on the height of the sample in the optical axis direction based on and using the stored color separation information, to thereby construct the image of the sample in the optical axis direction. If the chromatic aberration data are strictly analyzed with a spectroscope or the like to associate them with the height direction of the sample, it is then possible to take accurate measurements.

In that case, the relative positions of the objective and sample may be altered according to the amount of movement of the objective determined on the basis of the chromatic aberration data known thereon to construct the image of the sample in the optical axis direction based on the image information acquired by the microscope.

Now consider the case where the sample to be observed or measured is thicker than the focal depth. With reference here to a general microscope, an image is acquired while a relative distance between a sample and an objective is gradually varied, thereby constructing an image of the sample in the optical axis direction. For the purpose of preventing any lowering of resolving power, image processing must be carried out to remove blurred images. In the invention, blurred images are removed by an array of pinholes. The resolving power drop is reduced without recourse to image processing for removal of blurred images. A whole image of the sample can thus be constructed by a simple addition of sample height data for each image plane, which are obtained by acquiring data on one image plane basis for each focal depth and providing height separation of the sample on one image plane basis using the previously stored color separation data depending on sample height. Because of a great focal depth, the amount of movement of the objective in the optical axis direction, corresponding to one step, is determined from the amount of focal depth previously calculated or measured on the basis of the chromatic aberration data rather than from the focal depth calculated in an ordinary calculation way. Then, an image is acquired while the relative distance between the sample and objective is varied according to the thus determined amount of movement, thereby constructing the image of the sample in the optical axis direction. Since the confocal microscope of the invention has a great focal depth, the aforesaid image-constructing process enables the image of the sample in the optical axis direction to be constructed at a higher speed than would be possible with a general microscope.

In this case, the optical axis position of a sample surface with a confocal image formed thereon may be previously calculated or measured for each wavelength of light. Then, the optical axis position of the image obtained for each wavelength is determined on the basis of data known on the aforesaid optical axis position of the sample surface to reconstruct a two-dimensional plane image for each wavelength in alignment with the thus determined optical axis position, so that the image of the sample in the optical axis direction can be constructed.

The present invention further provides a confocal microscope wherein a pinhole substrate having a plurality of pinholes, located at a position of an image formed by an objective, or at a position conjugate with or in the vicinity of the position of the image, is illuminated by light coming from a light source to focus light passing through said pinhole substrate onto a sample by said objective so that an image is formed thereon, light reflected at said sample is again focused onto said pinhole substrate or a position in the vicinity thereof through said objective to form an image thereon, light passing through said pinhole substrate is focused by a relay lens or the like to re-form an image in the form of a sample image, and said sample is scanned with light by high-speed rotation of said pinhole substrate to obtain a reconstructed image of said sample, wherein, for attachment or detachment of the longitudinal chromatic aberration-producing optical element, the objective is designed to produce longitudinal chromatic aberration and an optical element for making correction for the longitudinal chromatic aberration produced at the objective is attached to or detached from a position of said longitudinal chromatic aberration-producing optical element. In this embodiment, too, such advantages as mentioned above are obtained.

Even when, for the attachment or detachment of the longitudinal chromatic aberration-producing optical element, the objective designed to produce longitudinal chromatic aberration is changed over to an objective less likely to produce longitudinal chromatic aberration, such advantages as mentioned above are obtainable.

It is desired that the quantity of chromatic aberrations produced by the aforesaid objective be larger than the focal depth of the objective with respect to the center wavelength in a wavelength region at which the objective is used. If that quantity is within the focal depth, images are put one upon another with no color separation, and so observation is difficult. It is also impossible to obtain a great focal depth.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The confocal microscope of the invention will now be explained with reference to some examples.

Figure 1:
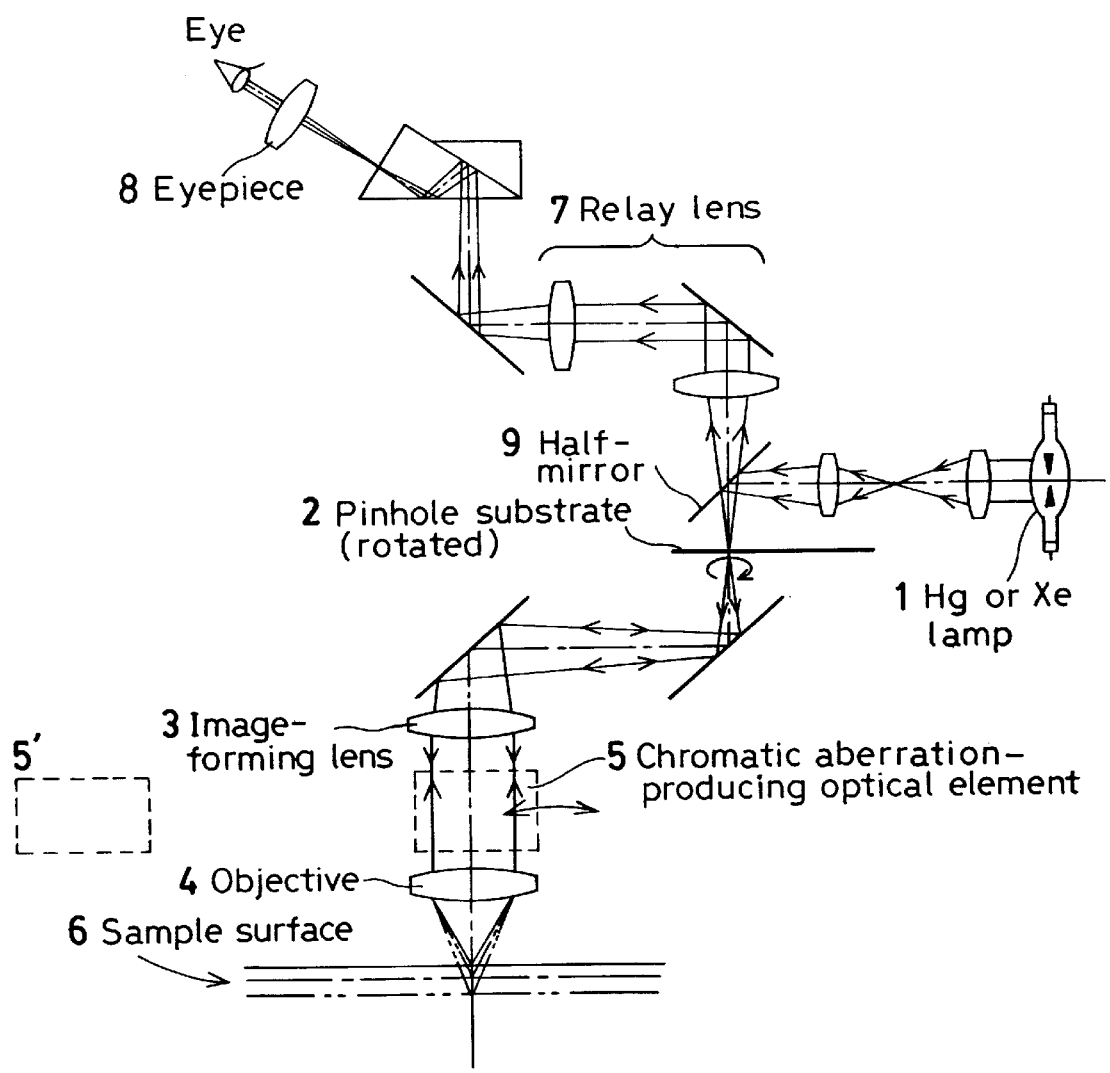
FIG. 1 is a schematic view of one confocal microscope of the invention.

FIG. 1 is a schematic view of one confocal microscope of the invention. In this confocal microscope, a pinhole substrate 2, located at a position of an image formed by an objective, is illuminated with light emitted from a high-intensity light source 1 such as a mercury or xenon lamp through a half-mirror 9, and light leaving an array of pinholes on the pinhole substrate 2 is then incident on an objective 4 via an image-forming lens 3. When a chromatic aberration-producing optical element 5 is not inserted in an optical path, the light is focused by the objective 4 onto one point on a sample surface 6. When the chromatic aberration-producing optical element 5 is inserted between the image-forming lens 3 and the objective 4, to what portion on the sample the light is focused varies depending on wavelength, as can be seen from FIG. 1. Whether the optical element 5 is inserted or not in the optical path, light reflected at the sample surface 6 comes back to the objective 4, so that an image is formed by the image-forming lens 3 on an array of pinholes on the pinhole substrate. When the optical element 5 is inserted in the optical path, light of varying wavelengths focused onto varying positions on the sample again passes through the optical element 5, so that the image can be formed at the same position in alignment with an array of pinholes on the pinhole substrate 2. At this time, blurred images, if any, can be removed by the confocal effect of the pinholes. Light passing through the pinholes now passes through the half-mirror 9, so that the image is formed by a relay lens 7 in front of an eyepiece 8. This image can be observed through the eyepiece 8 with the naked eye. When the chromatic aberration-producing optical element 5 is inserted in the optical path, a plurality of sectional information on the sample can thus be simultaneously observed in a separated color. Upon removal of the optical element 5, the amount of chromatic aberrations produced is so small that measurement and inspection can be carried out using chromatic information. It is desired to replace the chromatic aberration-producing optical element 5 in conformity to the magnification of the objective 4; that is, it is preferable to provide for a chromatic aberration-producing optical element 5' different from the chromatic aberration-producing optical element 5 in terms of the quantity of chromatic aberrations produced, as shown in FIG. 1.

Figure 2:
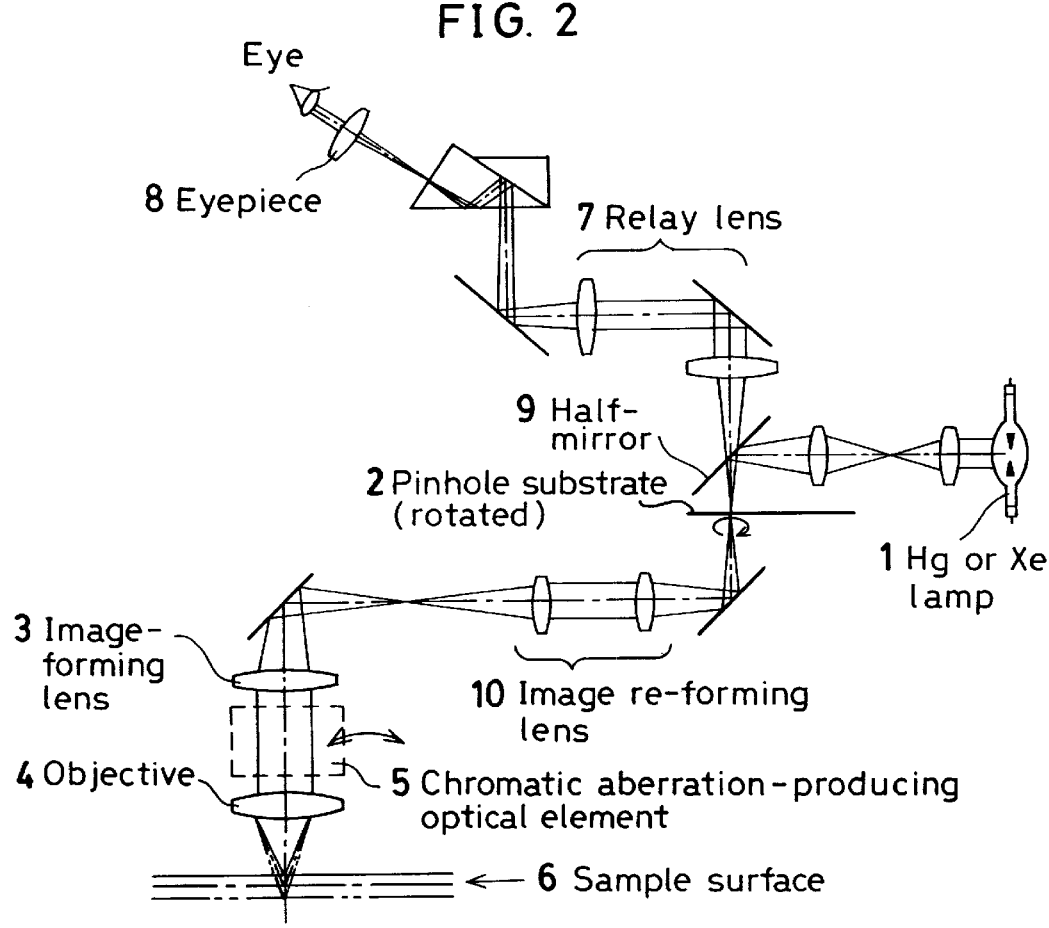
FIG. 2 is a schematic view of another confocal microscope of the invention.

FIG. 2 is a schematic view of another confocal microscope of the invention wherein a pinhole substrate 2 is located at a position conjugate with a position of an image formed by an objective 4. The arrangement of FIG. 2 is basically identical with that of FIG. 1 with the exception that the image by the objective 4 is formed by an image-reforming lens 10 on the pinhole substrate 2, and so a position of the image by the objective 4 is conjugate with the pinhole substrate 4.

Figure 3:
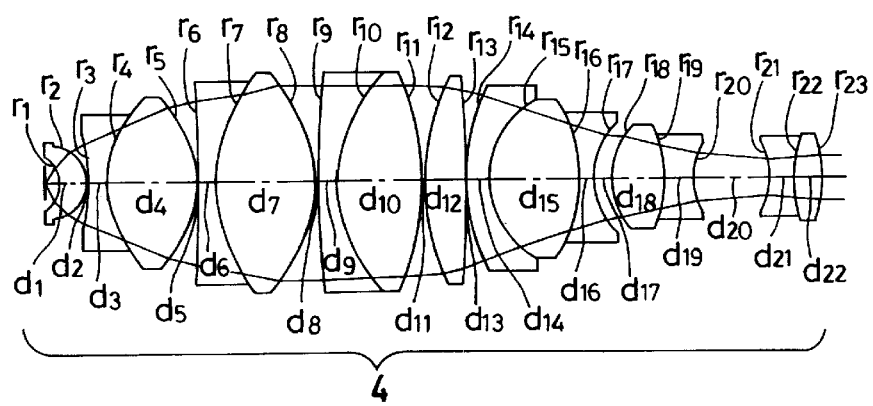
FIG. 3 is a sectional view of a microscope objective used commonly in the examples given below.

Given below are Examples 1 to 3 of the chromatic aberration-producing optical element 5 according to the invention. Prior to giving an account of each example, a microscope objective used commonly in the examples is explained. A section of the microscope objective is shown in FIG. 3. The objective has a focal length f of 1.8 mm, a magnification of 100×, an NA of 0.95 and a working distance of 0.77 mm. Lens data will be enumerated in Table 1, given later. Of the lens data, $r_1, r_2, \ldots$ are radii of curvature of lens surfaces as viewed in order from the object side, $d_1, d_2, \ldots$ are separations between respective lens surfaces as viewed in order from the object side, $n_{d1}, n_{d2}, \ldots$ are d-line refractive indices of lenses as viewed in order from the object side, and $\nu_{d1}, \nu_{d2}, \ldots$ are Abbe's numbers of lenses as viewed in order from the object side.

Figure 4:
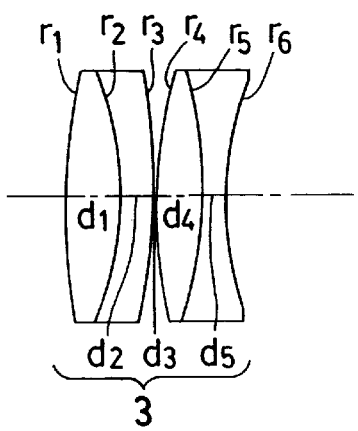
FIG. 4 is a sectional view of an image-forming lens used commonly in the examples given below.

The aforesaid objective is used in combination with an image-forming lens, a section of which is shown in FIG. 4. Lens data on this image-forming lens will be enumerated in Table 2, given later.

FIGS. 5(*a*) and 5(*b*) are a d-, C-, F-, and g-line aberration diagrams for an arrangement wherein the aforesaid objective and image-forming lens are combined with an air separation of 119 mm between them, showing spherical aberration FIG. 5(*a*) and coma FIG. 5(*b*). Longitudinal chromatic aberration produced at the objective is within the range of the focal depth. In FIG. 5(*b*), IH stands for image height.

EXAMPLE 1

Figure 6:
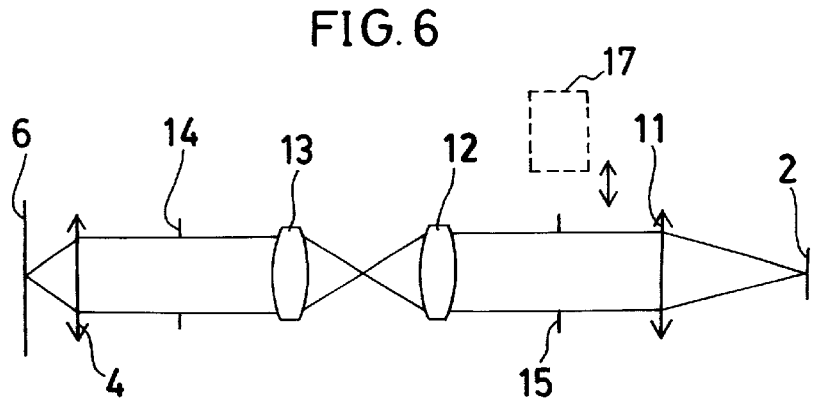
FIG. 6 is a view showing a lens arrangement or layout according to Example 1 of the invention.
Figure 7:
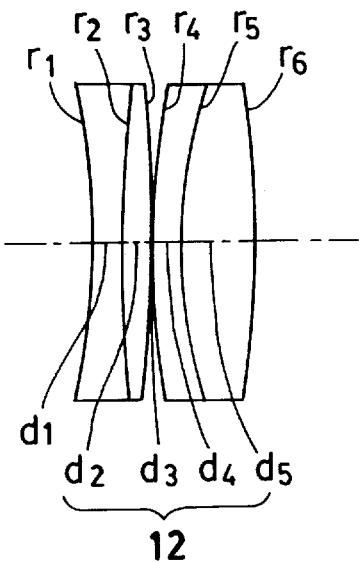
FIG. 7 is a sectional view of a relay lens located on an image-forming lens side in Example 1.
Figure 8:
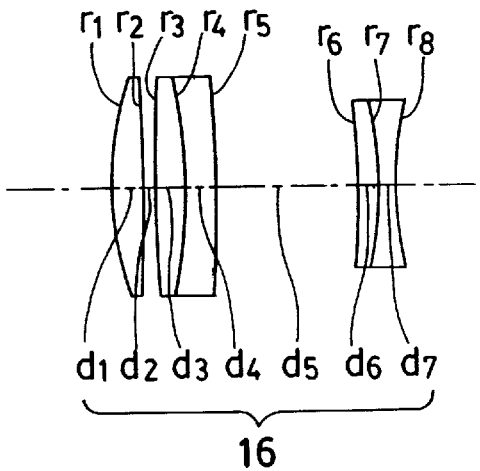
FIG. 8 is a sectional view of an afocal lens used in Example 1.
Figure 9:
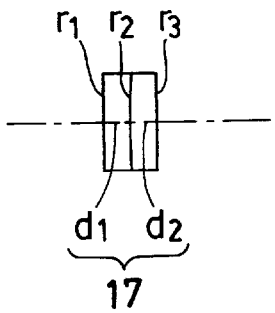
FIG. 9 is a sectional view of a chromatic aberration-producing optical element used in Example 1.
Figure 10A:
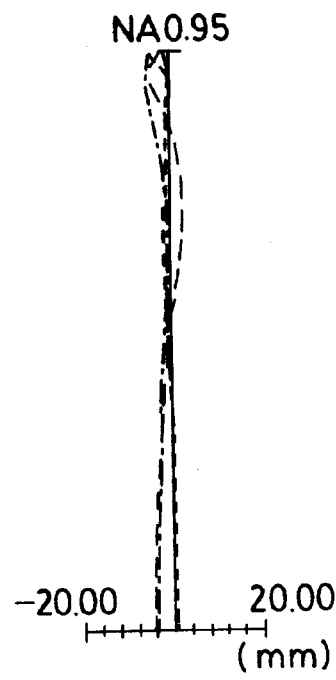
FIGS. 10(a) and 10(b) are aberration diagrams for a primary image plane on a pinhole substrate when the chromatic aberration-producing optical element is withdrawn from an optical path.
Figure 10B:
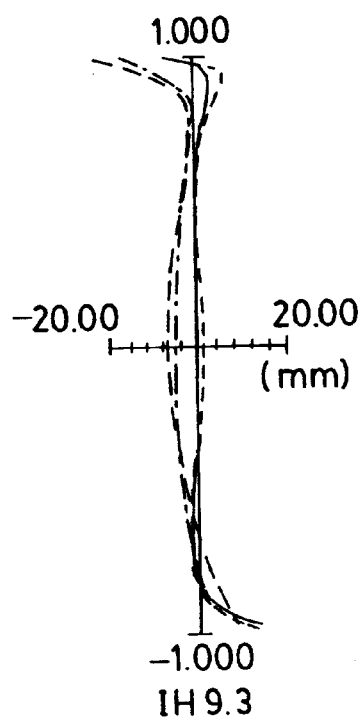
Figure 11A:
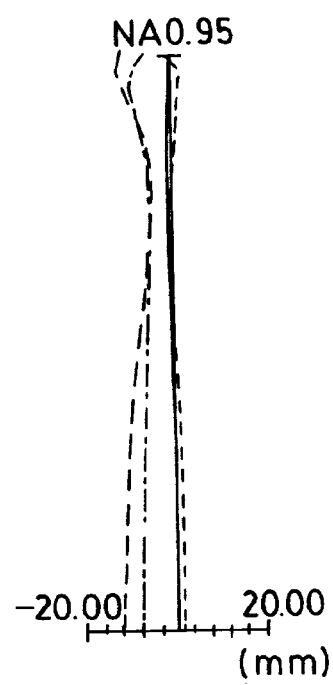
FIGS. 11(a) and 11(b) are aberration diagrams for a primary image plane on a pinhole substrate when the chromatic aberration-producing optical element of Example 1 is inserted in an optical path.
Figure 11B:
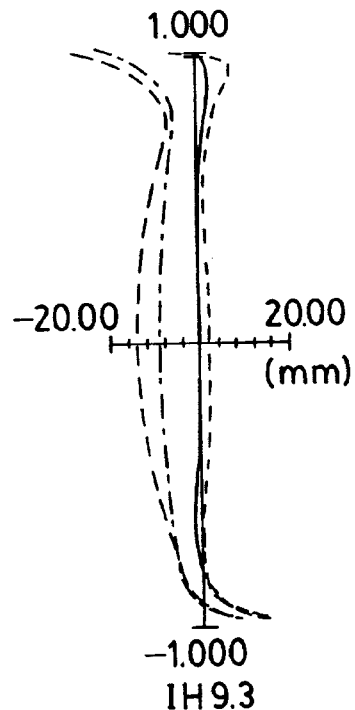

FIG. 6 shows a lens arrangement of Example 1 according to the invention. A light ray leaving a pinhole substrate 2 passes through an image-forming lens 11, and is incident on an objective 4 through relay lenses 12 and 13, so that it is focused onto a sample surface 6. A light ray leaving the sample surface 6 traces back the same path, reaching the pinhole substrate 2. The light ray upon passing through the pinhole substrate 2 directs to an observation side. A longitudinal chromatic aberration-producing optical element 17 is detachably inserted as a chromatic aberration-producing optical element in an optical path at a position 15 conjugate with a back focal position 14 of the objective 4. When the optical element 17 is inserted in the optical path, an optical axis direction of a sample can be observed while it is separated for each color. The objective 4 and relay lens 13 used may be the objective 4 and image-forming lens 3 of FIG. 1, which are shown in FIGS. 3 and 4, respectively. A section of the relay lens 12 is shown in FIG. 7. Lens data on the relay lens 12 will be enumerated in Table 3, given later. An image-forming lens 11 comprises an afocal lens 16 for converting and reducing a diameter of an incident parallel light beam to about 1/1.6 and emitting the light beam in the form of a parallel light beam, and the image-forming lens 13 shown in FIG. 4. A section of this afocal lens 16 is shown in FIG. 8. Lens data on the afocal lens 16 will be enumerated in Table 5, given later. A section of the longitudinal chromatic aberration-producing optical element 17 is shown in FIG. 9. Lens data on the optical element 17 will be enumerated in Table 5, given later. Symbols $r_1, r_2, \ldots$ are radii of curvature of lens surfaces as viewed in order from the object side, $d_1, d_2, \ldots$ are separations between respective lens surfaces as viewed in order from the object side, $n_{d1}, n_{d2}, \ldots$ are d-line refractive indices of lenses as viewed in order from the object side, and $\nu_{d1}, \nu_{d2}, \ldots$ are Abbe's numbers of lenses as viewed in order from the object side. FIGS. 10(*a*)–11(*b*) are each a d-, C-, F-, and g-line aberration diagram showing spherical aberration FIGS. 10(*a*) and 11(*a*) and coma FIGS. 10(*b*) and 11(*b*) when the longitudinal chromatic aberration-producing optical element 17 of Example 1 is inserted in, and withdrawn from, the optical path. At this time, an air separation between the objective 4 and the relay lens 13 is 185 mm, an air separation between the relay lens 13 and the relay lens 12 is 426.734 mm, an air separation between the relay lens 12 and the afocal lens 16 is 309.605 mm, and an air separation between the afocal lens 16 and the image-forming lens 3 of FIG. 4 is 50 mm. The longitudinal chromatic aberration-producing optical element 17 is inserted at a position spaced 279.605 mm away from the relay lens 12, and at a position of the object side spaced 24 mm away from the afocal lens 16.

From FIGS. 10(*a*)–11(*b*), it is found that upon attachment or detachment of the longitudinal chromatic aberration-producing optical element 17, a longitudinal chromatic aberration difference is about 0.44 μm on the sample surface 6, as calculated on an F-line. The confocal microscope has a focal depth δ given by $\delta=0.72\cdot\lambda/(NA)^2$ where NA is a numerical aperture of the objective used and λ is a wavelength used. In this regard, it is to be understood that when the image is resolved to its position in the optical axis direction where a peak intensity of point spread function becomes 80%, the focal depth is defined by a width before and behind that position. The focal depth of a common microscope is $\delta=\lambda/(NA)^2$. In the instant example, the focal depth is about 0.44 μm on condition that NA=0.95 and λ=0.55 μm. Consequently, a difference between d-line and F-line longitudinal chromatic aberrations in the instant example corresponds to the magnitude of focal depth and the focal depth doubles with respect to d-line alone or F-line alone. Chromatic coma for each color, too, is separated with respect to d-line by the same quantity as the longitudinal chromatic aberration, so that the focal depth can be uniformly increased throughout the range of view.

In the instant example, the left side member in condition (1) is found by calculation to be:

$$|41.08-61.18|\cdot(0.95)^2\cdot1.8/118.8=0.28$$

EXAMPLE 2

Figures 5A, 5B:
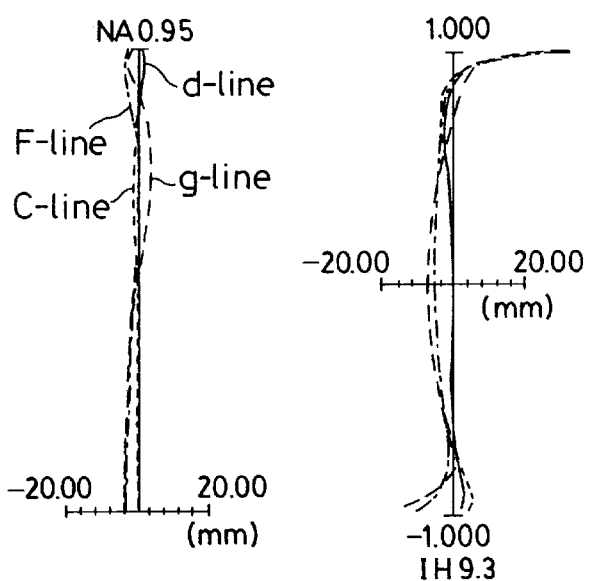
FIGS. 5(a) and 5(b) are aberration diagrams for a combination of the objective lens of FIG. 3 with the image-forming lens of FIG. 4.
Figure 12:
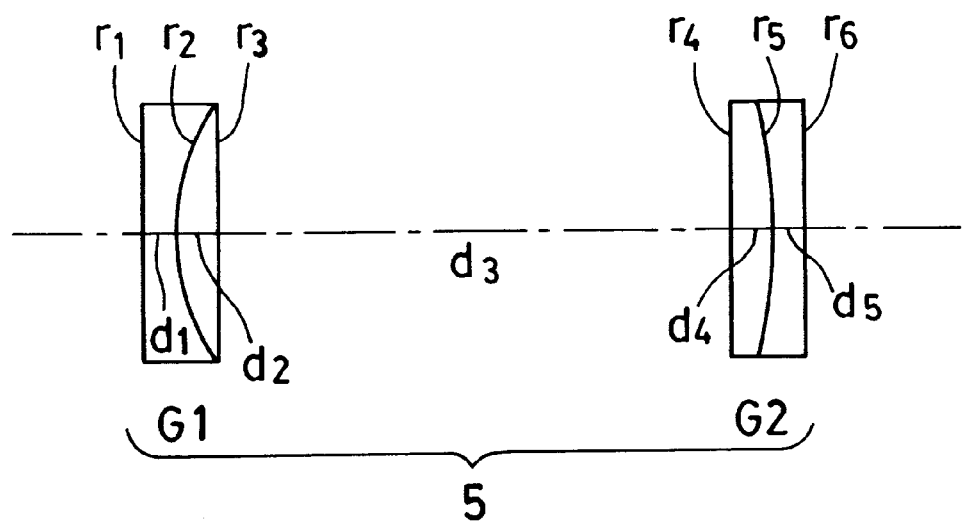
FIG. 12 is a sectional view of a chromatic aberration-production optical element used in Example 2.
Figure 13:
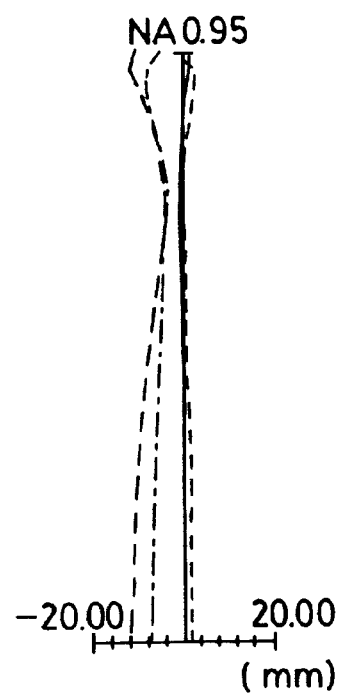
FIGS. 13(a) and 13(b) are aberration diagrams for a primary image plane on a pinhole substrate when the chromatic aberration-producing optical element of Example 2 is inserted in an optical path.
Figure 13:
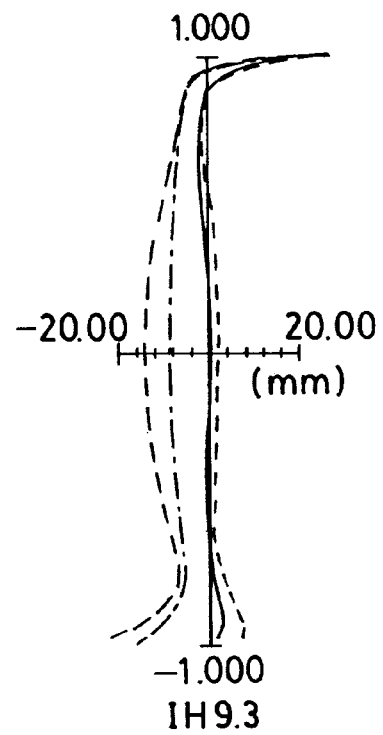

A lens arrangement of Example 2 is identical with that of FIG. 1. A chromatic aberration-producing optical element 5 is detachably inserted between an image-forming lens 3 and an objective 4. The chromatic aberration-producing optical element 5 comprises two lens groups G1 and G2, sections of which are shown in FIG. 12. Here aberrations produced by the lens group G1 are mainly chromatic aberrations. The lens group G2 is designed to make correction for other aberrations produced at the lens group G1, especially chromatic aberration of magnification. Lens data on the chromatic aberration-producing optical element 5 will be enumerated in Table 5, given later. Symbols $r_1, r_2, \ldots$ are radii of curvature of lens surfaces as viewed in order from the object side, $d_1$, $d_2$, . . . are separations between respective lens surfaces as viewed in order from the object side, $n_{d1}$, $n_{d2}$, . . . are d-line refractive indices of lenses as viewed in order from the object side, and $v_{d1}$, $v_{d2}$, are Abbe's numbers of lenses as viewed in order from the object side. FIGS. 13(a) and 13(b) are d-, C-, F-, and g-line aberration diagrams showing spherical aberration FIG. 13(a) and coma FIG. 13(b) when the longitudinal chromatic aberration-producing optical element 5 of this example is inserted in the optical path. In this regard, it is to be noted that an aberration diagram in the case where the chromatic aberration-producing optical element 5 is not inserted in the optical path is shown in FIGS. 5(a) and 5(b). At this time, an air separation between the objective 4 and the lens group G1 in the chromatic aberration-producing optical element 5 is 16 mm, and an air separation between the lens group G2 in the chromatic aberration-producing optical element 5 and the image-forming lens 3 is 10 mm. The quantity of chromatic aberrations produced and the focal depth increase are substantially the same as in Example 1. When the objective 4 is changed over to the objective of FIG. 3 having an NA of ½, the focal depth of the objective 4 increases 4-fold; that is, the quantity of chromatic aberrations produced by the chromatic aberration-producing optical element 5 is insufficient. In this case, it is desired to replace the chromatic aberration-producing optical element 5 by a chromatic aberration-producing optical element that produces chromatic aberrations 4 times as large as those produced by the optical element 5.

In the instant example, calculating the left side member in condition (1) with respect to the lens group G1 in the chromatic aberration-producing optical element 5 gives $$|41.08-61.18|.(0.95)^2.1.8/33.9=0.96$$

Calculating the left side member in condition (1) with respect to the lens group G2 in the chromatic aberration-producing optical element 5 gives $$|61.18-41.08|.(0.95)^2.1.8/118.89=0.28$$

Since $|41.08-61.181/33.9>|61.18-41.08|/118.8$, it is found that condition (3), too, is satisfied.

EXAMPLE 3

Figure 14:
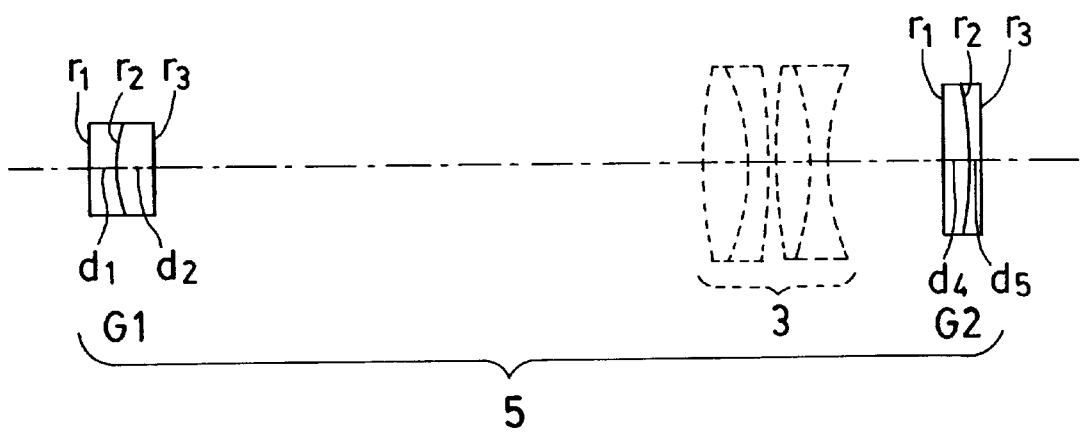
FIG. 14 is a sectional view of a chromatic aberration-producing optical element used in Example 3.
Figure 15A:
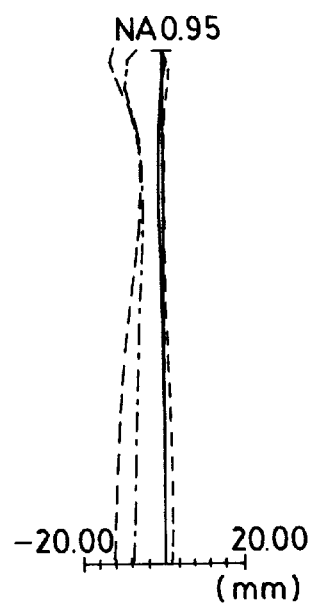
FIGS. 15(a) and 15(b) are aberration diagrams for a primary image plane on a pinhole substrate when the chromatic aberration-producing optical element of Example 3 is inserted in an optical path.
Figure 15B:
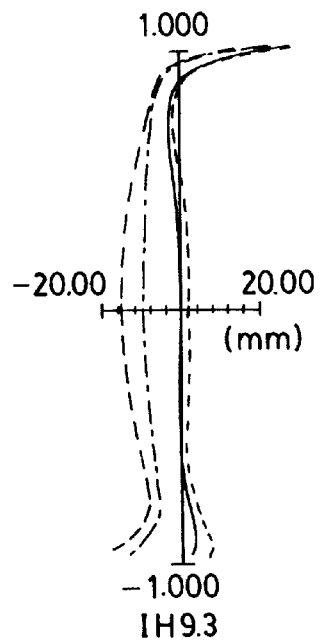

A basic lens arrangement of Example 3, too, is identical with that of FIG. 1. However, a chromatic aberration-producing optical element 5 is designed as shown in a sectional view of FIG. 14. The chromatic aberration-producing optical element 5 comprises two lens groups G1 and G2, and the lens group G1 is located between an objective 4 25 and an image-forming lens 3 to produce chromatic aberrations principally. The lens group G2 is located between the image-forming lens 3 and a pinhole substrate 2 to make correction for other aberrations produced at the lens group G1, especially chromatic aberration of magnification. Lens data on this chromatic aberration-producing optical element 5 will be enumerated in Table 7, given later. Symbols $r_1$, $r_2$, . . . are radii of curvature of lens surfaces as viewed in order from the object side, $d_1$, $d_2$, . . . are separations between respective lens surfaces as viewed in order from the object side, $n_{d1}$, $n_{d2}$, . . . are d-line refractive indices of lenses as viewed in order from the object side, and $v_{d1}$, $v_{d2}$, . . . are Abbe's numbers of lenses as viewed in order from the object side. FIGS. 15(a) and 15(b) are d-, C-, F-, and g-line aberration diagrams showing spherical aberration FIG. 15(a) and coma 15(b) when the longitudinal chromatic aberration-producing optical element 5 of this example is inserted in the optical path. In this regard, it is to be noted that an aberration diagram in the case where the chromatic aberration-producing optical element 5 is not inserted in the optical path is shown in FIG. 5(a) and 5(b). At this time, an air separation between the objective 4 and the lens group G1 in the chromatic aberration-producing optical element 5 is 16 mm, an air separation between the lens group G1 in the optical element 5 and the image-forming lens 3 is 90 mm, and an air separation between the image-forming lens 3 and the lens group G2 in the optical element 5 is 10 mm. The quantity of chromatic aberrations produced and the focal depth increase are substantially the same as in Examples 1 and 2. It is here to be noted that a spacing between the lens groups G1 and G2 in the chromatic aberration-producing optical element 5 is the above-mentioned separations 90 mm and 10 mm plus the thickness of the image-forming lens 3.

In the instant example, calculating the left side member in condition (1) with respect to the lens group G1 in the chromatic aberration-producing optical element 5 gives $$|41.08-61.18|.(0.95)^2.1.8/33.9=0.96$$

Calculating the left side member in condition (1) with respect to the lens group G2 in the chromatic aberration-producing optical element 5 gives $$|61.18-41.08|.(0.95)^2.1.8/101.8=0.32$$

Since $|41.08-61.18|/33.9>|61.18-41.08|/101.8$, it is found that condition (3), too, is satisfied.

EXAMPLE 4

Figure 16:
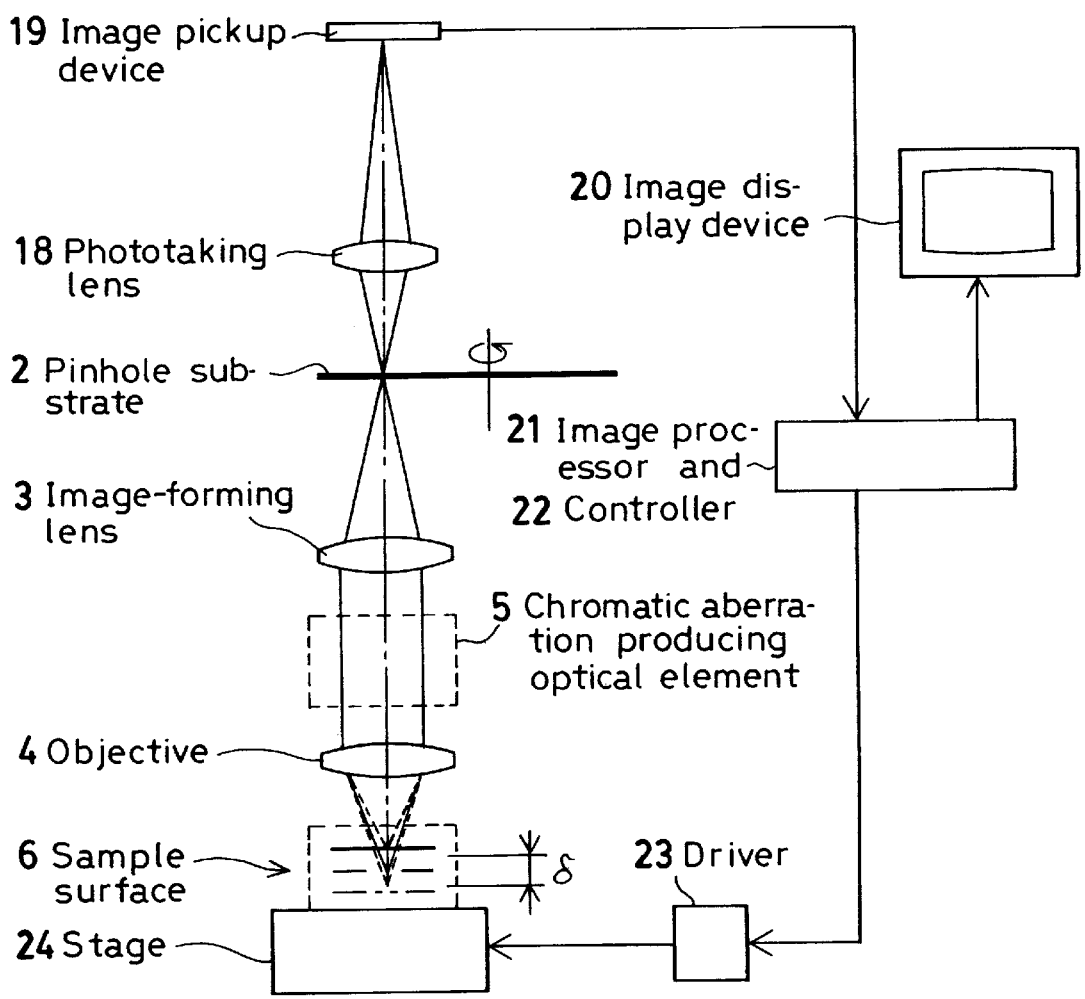
FIG. 16 is a schematic view of Example 4.

An arrangement of Example 4 is shown in FIG. 16. For the purpose of simplification, an illumination optical system is not shown in FIG. 16. Light emitted from a sample surface 6 upon the illumination of the sample surface 6 passes through an objective 4, a chromatic aberration-producing optical element 5 and an image-forming lens 3 to form a primary image on a pinhole substrate 2. Upon passing through the pinhole substrate 2, the light passes through a phototaking lens 18 to re-form an image on an image pickup device 19. The image formed on the image pickup device 19 includes a plurality of sectional information on a sample while it is separated for each color. If the image pickup device 19 is a device capable of separating chromatic information to acquire it in the form of an image, the image can then be observed in the form of a color image having a great focal depth on an image display device 20. If the order, depth, etc., of focusing are previously designed by experimentation depending on the quantity of chromatic aberrations produced or color to store them in an image processor 21 or the like, it is then possible to construct a three-dimensional image of a sample on the basis of the stored chromatic aberration data. With the confocal microscope of the invention, a three-dimensional image of a sample thicker than a focal depth 6 thereof may be constructed in the optical axis direction. In this case, however, it is required to acquire an image for each step 6 of moving a stage 24 via a controller 22 and a driver 23. It is thus possible to acquire, display, and measure information on an optical axis direction of a sample at a higher speed than would be possible with a conventional microscope.

TABLE 1

| | | | |
|---|---|---|---|
| $r_1 = -2.2936$ | $d_1 = 1.7700$ | $n_{d1} = 1.88300$ | $v_{d1} = 40.78$ |
| $r_2 = -2.1326$ | $d_2 = 0.1416$ | | |
| $r_3 = -10.6925$ | $d_3 = 1.1000$ | $n_{d2} = 1.61340$ | $v_{d2} = 43.84$ |
| $r_4 = 7.1166$ | $d_4 = 5.5000$ | $n_{d3} = 1.61800$ | $v_{d3} = 63.39$ |
| $r_5 = -7.6238$ | $d_5 = 0.2000$ | | |
| $r_6 = -64.2877$ | $d_6 = 1.0000$ | $n_{d4} = 1.52944$ | $v_{d4} = 51.72$ |
| $r_7 = 10.2264$ | $d_7 = 6.2000$ | $n_{d5} = 1.43875$ | $v_{d5} = 94.97$ |
| $r_8 = -9.6473$ | $d_8 = 0.2000$ | | |
| $r_9 = 57.3942$ | $d_9 = 1.2000$ | $n_{d6} = 1.61340$ | $v_{d6} = 43.84$ |
| $r_{10} = 9.2329$ | $d_{10} = 5.2000$ | $n_{d7} = 1.43875$ | $v_{d7} = 94.97$ |
| $r_{11} = -18.4308$ | $d_{11} = 0.3000$ | | |
| $r_{12} = 15.2753$ | $d_{12} = 2.5000$ | $n_{d8} = 1.56907$ | $v_{d8} = 71.30$ |
| $r_{13} = -147.8112$ | $d_{13} = 0.2000$ | | |
| $r_{14} = 13.4472$ | $d_{14} = 1.3000$ | $n_{d9} = 1.52944$ | $v_{d9} = 51.72$ |
| $r_{15} = 55507$ | $d_{15} = 5.5000$ | $n_{d10} = 1.43875$ | $v_{d10} = 94.97$ |
| $r_{16} = -9.4406$ | $d_{16} = 1.0001$ | $n_{d11} = 1.51633$ | $v_{d11} = 64.15$ |
| $r_{17} = 4.6960$ | $d_{17} = 1.0000$ | | |
| $r_{18} = 4.5949$ | $d_{18} = 3.2000$ | $n_{d12} = 1.49700$ | $v_{d12} = 81.61$ |
| $r_{19} = -9.4136$ | $d_{19} = 1.8812$ | $n_{d13} = 1.78650$ | $v_{d13} = 50.00$ |
| $r_{20} = 5.2173$ | $d_{20} = 4.5626$ | | |
| $r_{21} = -5.3868$ | $d_{21} = 1.5744$ | $n_{d14} = 1.77250$ | $v_{d14} = 49.60$ |
| $r_{22} = 9.3410$ | $d_{22} = 1.7000$ | $n_{d15} = 1.80518$ | $v_{d15} = 25.43$ |
| $r_{23} = -10.1181$ | | | |

TABLE 2

| | | | |
|---|---|---|---|
| $r_1$ 32 68.7541 | $d_1 = 7.7321$ | $n_{d1} = 1.48749$ | $v_{d1} = 70.20$ |
| $r_2$ 32 −37.5679 | $d_2 = 3.4742$ | $n_{d2} = 1.80610$ | $v_{d2} = 40.95$ |
| $r_3$ 32 −102.8477 | $d_3 = 0.6973$ | | |
| $r_4$ 32 84.3099 | $d_4 = 6.0238$ | $n_{d3} = 1.83400$ | $v_{d3} = 37.16$ |
| $r_5$ 32 −50.7100 | $d_5 = 3.0298$ | $n_{d4} = 1.64450$ | $v_{d4} = 40.82$ |
| $r_6$ 32 40.6619 | | | |

TABLE 3

| | | | |
|---|---|---|---|
| $r_1 = -104.154$ | $d_1 = 4.20$ | $n_{d1} = 1.61340$ | $v_{d1} = 43.84$ |
| $r_2 = 199.976$ | $d_2 = 4.00$ | $n_{d2} = 1.83400$ | $v_{d2} = 37.17$ |
| $r_3 = -202.513$ | $d_3 = 0.50$ | | |
| $r_4 = 157.532$ | $d_4 = 4.00$ | $n_{d3} = 1.80610$ | $v_{d3} = 40.95$ |
| $r_5 = 82.098$ | $d_5 = 9.78$ | $n_{d4} = 1.43875$ | $v_{d4} = 94.97$ |
| $r_6 = -134.412$ | | | |

TABLE 4

| | | | |
|---|---|---|---|
| $r_1 = 41.314$ | $d_1 = 3.52$ | $n_{d1} = 1.48749$ | $v_{d1} = 70.21$ |
| $r_2 = -367.18$ | $d_2 = 1.20$ | | |
| $r_3 = 163.098$ | $d_3 = 3.70$ | $n_{d2} = 1.48749$ | $v_{d2} = 70.21$ |
| $r_4 = -49.090$ | $d_4 = 3.15$ | $n_{d3} = 1.69895$ | $v_{d3} = 30.12$ |
| $r_5 = -197.059$ | $d_5 = 16.13$ | | |
| $r_6 = -95.011$ | $d_6 = 2.50$ | $n_{d4} = 1.84666$ | $v_{d4} = 23.78$ |
| $r_7 = -34.138$ | $d_7 = 1.80$ | $n_{d5} = 1.72916$ | $v_{d5} = 54.68$ |
| $r_8 = 39.369$ | | | |

TABLE 5

| | | | |
|---|---|---|---|
| $r_1 = \infty$ | $d_1 = 3$ | $n_{d1} = 1.58913$ | $v_{d1} = 61.18$ |
| $r_2 = 70$ | $d_2 = 3$ | $n_{d2} = 1.58921$ | $v_{d2} = 41.08$ |
| $r_3 = \infty$ | | | |

TABLE 6

| | | | |
|---|---|---|---|
| $r_1 = \infty$ | $d_1 = 4$ | $n_{d1} = 1.58913$ | $v_{d1} = 61.18$ |
| $r_2 = 20$ | $d_2 = 6$ | $n_{d2} = 1.58921$ | $v_{d2} = 41.08$ |
| $r_3 = \infty$ | $d_3 = 70$ | | |
| $r_4 = \infty$ | $d_4 = 6$ | $n_{d3} = 1.58913$ | $v_{d3} = 61.18$ |
| $r_5 = -70$ | $d_5 = 4$ | $n_{d4} = 1.58921$ | $v_{d4} = 41.08$ |
| $r_6 = \infty$ | | | |

TABLE 7

| | | | |
|---|---|---|---|
| $r_1 = \infty$ | $d_1 = 4$ | $n_{d1} = 1.58913$ | $v_{d1} = 61.18$ |
| $r_2 = 20$ | $d_2 = 6$ | $n_{d2} = 1.58921$ | $v_{d2} = 41.08$ |
| $r_3 = \infty$ | $d_3 = 120.9572$ | | |
| $r_4 = \infty$ | $d_4 = 4$ | $n_{d3} = 1.58913$ | $v_{d3} = 61.18$ |
| $r_5 = -60$ | $d_5 = 2.$ | $n_{d4} = 1.58921$ | $v_{d4} = 41.08$ |
| $r_6 = \infty$ | | | |

As can be seen from the foregoing description, the present invention can provide a confocal microscope using a pinhole substrate, which enables a profile of a sample in an optical axis direction to be separated for each color by inserting a longitudinal chromatic aberration-producing optical element between the pinhole substrate and the sample and, at the same time, enables high resolving power and a great focal depth to be achieved in real time or at a speed higher than video rates.

Furthermore in the invention, image processing is carried out on the basis of chromatic aberration data known on the chromatic aberration-producing element, so that an image of the sample in the optical axis direction can be constructed at a speed higher than would be possible in the art.

What we claim is:

1. A confocal microscope, comprising:
   a light source for illuminating a sample;
   a pinhole substrate having a plurality of pinholes permitting illumination light from said light source to pass therethrough;
   an objective lens and image formation optical system located between said sample and said pinhole substrate;
   a relay lens located on a side of said light source with respect to said pinhole substrate for pre-forming light passing through said pinholes into an image; and
   a longitudinal chromatic aberration-producing optical element located in an optical path between said pinhole substrate and said sample,
   said pinhole substrate being located at a position selected from the group of positions consisting of
   a position of an image formed by said objective lens and image formation optical system,
   a position in the vicinity of said position of said image,
   a position conjugate with said position of said image, and
   a position in the vicinity of said conjugate position, and
   said objective lens being arranged to focus illumination light passing through said pinhole substrate onto said sample; and
   said image formation optical system being arranged to focus light passing through said objective lens upon reflection from said sample,
   wherein longitudinal chromatic aberration produced by said objective lens and said image formation optical system is smaller than a focal depth of said objective lens, and
   wherein said longitudinal chromatic aberration-producing element is mounted such that said longitudinal chromatic aberration-producing element is adapted to be detachably inserted between said pinhole substrate and said sample.

2. A confocal microscope according to claim 1, wherein a refracting power of said optical element with respect to a center wavelength in a wavelength region used is substantially zero.

3. A confocal microscope according to claims 1 or 2, wherein said optical element is located between said pinhole substrate and said objective, and at a position selected from the group of positions consisting of a back focal position of said objective, a position in the vicinity of said back focal position;

a position conjugate with the back focal position of said objective, and a position in the vicinity of said position conjugate with said back focal position.

4. A confocal microscope according to claims 1 or 2, wherein said optical element comprises at least one convex lens and at least one concave lens, and satisfies the following condition (1):

$$|v_P - v_N| \cdot (NA)^2 \cdot f_{OB}/f > 0.01 \quad (1)$$

where $v_P$ is an Abbe's number of said convex lens at a center wavelength $\lambda$, $v_N$ is an Abbe's number of said concave lens ad the center wavelength $\lambda$, $f_{OB}$ is a focal length of the objective used at-the center wavelength $\lambda$, NA is a numerical aperture of the objective used, and f is a focal length of said convex lens at the center wavelength $\lambda$.

5. A confocal microscope according to claim 4, wherein said optical element comprises one convex lens and one concave lens, and-satisfies the following condition (1):

$$|v_P - v_N| \cdot (NA)^2 \cdot f_{OB}/f > 0.01 \quad (1)$$

where $v_P$ is an Abbe's number of said convex lens at a center wavelength $\lambda$, $v_N$ is an Abbe's number of said concave lens at the center wavelength $\lambda$, $f_{OB}$ is a focal length of the objective used at the center wavelength $\lambda$, NA is a numerical aperture of the objective used, and f is a focal length of said convex lens at the center wavelength $\lambda$.

6. A confocal microscope according to claims 1 or 2, further comprising an image pickup element;

an image processing device constructed and arranged to reconstruct an image of said sample in an optical axis direction on the basis of phototaken data from said image pickup element and longitudinal chromatic aberration data known for said longitudinal chromatic aberration-producing optical element; and a display device.

7. A confocal microscope according to claim 6, further comprising a moving mechanism, wherein said image processing device produces a moving signal predetermined on the basis of longitudinal chromatic aberration data known for said longitudinal chromatic aberration-producing optical element, and said moving mechanism varies a relative separation between said objective lens and said sample in the optical axis direction in response to said moving signal.

8. A confocal microscope comprising:

a light source for illuminating a sample;

a pinhole substrate having a plurality of pinholes permitting illumination light from said light source to pass therethrough;

an objective lens and image formation optical system located between said sample and said pinhole substrate;

a relay lens located on a side of said light source with respect to said pinhole substrate for pre-forming light passing through said pinholes into an image;

a longitudinal chromatic aberration-producing optical element located in an optical path between said pinhole substrate and said sample; and a plurality of longitudinal chromatic aberration-producing optical elements for producing different longitudinal chromatic aberrations at least one of said plurality of longitudinal chromatic aberration-producing optical elements being selectively located between said pinhole substrate and said sample, said pinhole substrate being located at a position selected from the group of positions consisting of a position of an image formed by said objective lens and image formation optical system, a position in the vicinity of said position of said image, a position conjugate with said position of said image, and a position in the vicinity of said conjugate position, and said objective lens being arranged to focus illumination light passing through said pinhole substrate onto said sample; and said image formation optical system being arranged to focus light passing through said objective lens upon reflection from said sample, wherein longitudinal chromatic aberration produced by said objective lens and said image formation optical system is smaller than a focal depth of said objective lens, wherein said plurality of longitudinal chromatic aberration-producing optical elements includes the first-mentioned longitudinal chromatic aberration-producing optical element, and wherein said plurality of longitudinal chromatic aberration-producing optical elements are mounted in at least one of a replaceable, attachable or detachable manner.

9. A confocal microscope according to claim 8, wherein at least one of said at least two optical elements satisfies the following condition (1):

$$|v_P - v_N|(NA)^2 f_{OB}/f > 0.01 \quad (1)$$

where $v_P$ is an Abbe's number of said convex lens at a center wavelength $\lambda$, $v_N$ is an Abbe's number of said concave lens at the center wavelength $\lambda$, $f_{OB}$ is a focal length of the objective used at the center wavelength $\lambda$, NA is a numerical aperture of the objective used, and f is a focal length of said convex lens at the center wavelength.

10. A confocal microscope according to claim 9, wherein said optical elements are constructed to be replaceable by attachment and detachment depending on a type of said objective.

11. A confocal microscope according to claim 8, wherein said plurality of longitudinal chromatic aberration-producing optical elements are constructed to be replaceable by attachment and detachment depending on a type of said objective lens.

12. A confocal microscope, comprising:

a light source for illuminating a sample;

a pinhole substrate having a plurality of pinholes permitting illumination light from said light source to pass therethrough;

an objective lens and image formation optical system located between said sample and said pinhole substrate;

a relay lens located on a side of said light source with respect to said pinhole substrate for pre-forming light passing through said pinholes into an image, said pinhole substrate being located at a position selected from the group of positions consisting of a position of an image formed by said objective lens and image formation optical system, a position in the vicinity of said position of said image, a position conjugate with said position of said image, and a position in the vicinity of said conjugate position, and said objective lens being arranged to focus illumination light passing through said pinhole substrate onto said sample; and said image formation optical system being arranged to focus light passing through said objective lens upon reflection from said sample, wherein a first objective lens of said objective lens and a second objective lens of said objective lens are mounted in such a way that they are changeable with each other, longitudinal chromatic aberration produced by said first objective lens and said image formation optical system is larger than a focal depth of said first objective lens and longitudinal chromatic aberration produced by said second objective lens and said image formation optical system is smaller than a second focal depth of said second object lens.

* * * * *